US006954591B2

(12) United States Patent
Lupton et al.

(10) Patent No.: US 6,954,591 B2
(45) Date of Patent: Oct. 11, 2005

(54) NON-VISIBLE COMMUNICATION SYSTEMS

(76) Inventors: Elmer C. Lupton, 3 Tremont St., Charlestown, MA (US) 02129; Steven B. Leeb, 7 Porspect St., Belmont, MA (US) 02478; George B. Hovorka, 3 Hodgkins Rd., Rockport, MA (US) 01966; Deron Jackson, 2228 Quail Bluff La., San Jose, CA (US) 95121; Billie L. Bentzen, P.O. Box 1212, Berlin, MA (US) 01503

( * ) Notice: Subject to any disclaimer, the term of this patent is extended or adjusted under 35 U.S.C. 154(b) by 153 days.

(21) Appl. No.: 10/161,458

(22) Filed: May 31, 2002

(65) Prior Publication Data

US 2003/0035177 A1 Feb. 20, 2003

Related U.S. Application Data

(63) Continuation of application No. 09/291,709, filed on Apr. 14, 1999, now Pat. No. 6,400,482.
(60) Provisional application No. 60/115,374, filed on Jan. 11, 1999, provisional application No. 60/108,287, filed on Nov. 13, 1998, and provisional application No. 60/081,866, filed on Apr. 15, 1998.

(51) Int. Cl.[7] .............................................. H04B 10/10
(52) U.S. Cl. ....................... 398/115; 398/106; 398/127; 398/112; 398/172; 398/185
(58) Field of Search ................................ 359/144–149, 359/172; 398/172, 185, 115, 106, 127, 112

(56) References Cited

U.S. PATENT DOCUMENTS

| 5,173,881 A | * | 12/1992 | Sindle ........................ 367/101 |
| 5,319,190 A | * | 6/1994 | Allen et al. ............ 250/214 VT |
| 5,550,434 A | * | 8/1996 | King et al. ................... 315/160 |
| 5,648,862 A | * | 7/1997 | Owen ......................... 359/153 |
| 5,719,567 A | * | 2/1998 | Norris ......................... 340/953 |
| 5,729,016 A | * | 3/1998 | Klapper et al. ............. 250/334 |
| 5,804,829 A | * | 9/1998 | Palmer .................... 250/504 H |
| 5,917,430 A | * | 6/1999 | Greneker et al. ........... 340/905 |
| 5,966,091 A | * | 10/1999 | Andersson .................... 342/60 |
| 6,198,230 B1 | | 3/2001 | Leeb et al. .................. 315/224 |
| 6,400,482 B1 | | 6/2002 | Lupton et al. .............. 359/154 |
| 6,504,633 B1 | * | 1/2003 | Hovorka et al. ............. 359/142 |

OTHER PUBLICATIONS

U.S. Appl. No. 60/085,261, filed Apr. 15, 1998, Leeb et al.
U.S. Appl. No. 60/108,287, filed Nov. 13, 1998, Hovorka et al.
U.S. Appl. No. 60/115,374, filed Jan. 11, 1999, Hovorka et al.
U.S. Appl. No. 60/191,725, filed Mar. 24, 2000, Leeb et al.
Abowd, et al., "Software Design Issues for Ubiquitous Computing", VLSI '98, *Proceedings, IEEE Computer Society Workshop on System Level Design*, 104–109, 1999.
Angrilli, et al., "Calibration of Stereo Vision Systems by Neural Networks", IMTC–96, Conference Proceedings, "Quality Measurement" The Indespensable Bridge Between Theory and Reality, *IEEE*, 2: 839–842, 1996.

(Continued)

*Primary Examiner*—Leslie Pascal
(74) *Attorney, Agent, or Firm*—Choate, Hall & Stewart (57) ABSTRACT

Network for transmitting and using electromagnetic radiation for two or more functionally different useful purposes. Such a network may be comprised of a signal source apparatus to provide information, an electromagnetic radiation generator capable of being modulated for providing electromagnetic radiation, electronic circuitry for modulating the electromagnetic radiation generator, medium through which the electromagnetic radiation passes and is transmitted, a receiver apparatus for receiving and demodulating the modulated electromagnetic radiation, a first user means for processing and making use of the information to achieve a useful functional purpose, and second user means for achieving a useful functional purpose from said radiation said useful functional purpose being different from the purpose of said first user means.

4 Claims, 6 Drawing Sheets

OTHER PUBLICATIONS

Azuma, R. Tracking Requirements for Augmented Reality, *Communications of the ACM*, 6(7): 50–51, 1995.

Bacon, et al., "Location–Oriented Multmedia", *IEEE Personal Communications*, 48–57, 1997.

Bahl, R., "An In–Building RF–Based User Location and Tracking System", Proceedings, INFOCOM 2000, 19th Annual Joint Conference of the IEEE Computing and Communication Societies, 2: 775–784, 2000.

Brown et al., "Context–Aware Applications: From the Laboratory to the Marketplace", *IEEE Personal Communications*, 58–64, 1997.

Chen, et al., "MESH: Multi–Eye Spiral–Hopping Routing Protocol in a Wireless Ad Hoc Network", *Proceedings 9th IEEE Int'l Conference on Computer Communications and Networks*, 657–661, 2000.

Couderc, et al., "Improving Level of Service for Mobile Users Using Context–Awareness", *Proceedings of the 18th IEEE Symposium on Reliable Distributed System*, 24–33, 1999.

Dey, et al., "The Conference Assistant: Combining Context–Awareness with Wearable Computing", *Digest of Papers, 3rd Int'l Symposium on Wearable Computers*, 21–28, 1999.

Jagannathan, et al., "A Fast Algorithm for Context–Aware Buffer Insertions", *Proceedings 37th Design Automation Conference*, 368–373, 2000.

Kim, et al., "Location–Aware Long–Life Route Selection in Wireless Ad Hoc Networks", *Electronics Letters*, 36(18): 1584–1586, 2000.

Kim, "Location–Aware Long–Lived Route Selection in Wireless Ad Hoc Network" 52nd Vehicular Technology Conference, IEEE, 4: 1914–1919, 2000.

Kindberg, et al., "People, Places Things: Web Presence for the Real World", 3rd IEEE Workshop on Mobile Computing Systems and Applications, *IEEE*, 19–28, 2000.

Ko, et al., "Personalized Virtual Exhibition Tour(PVET): An Experiment for Internet Collaboration", *IEEE International Conference on Syp.* 25–29, 1999.

Kortuem, et al., "Context–Aware, Adaptive Wearable Computers as Remote Interfaces to 'Intelligent' Environments", *Second Int'l Symposium on Wearable Computers*, 58–65, 1998.

Kovacs, et al., "Adaptive Mobile Access to Context–Aware Services", *Proceedings, First Int'l Symposium on Agent Systems and Applications and 3rd Int'l Symposium on Mobile Agents*, 190–201, 1999.

Kubach, et al., "An Adaptive, Location–Aware Hoarding Mechanism", *Proceedings, ISCC, 5th IEEE Symposium on Computers and Communication*, 615–620, 2000.

Leonhardi, et al., "Virtual Information Towers—A Metaphor for Intuitive, Location–Aware Information Access in a Mobile Environment", *3rd International Symposium on Wearable Computers*, 15–20, 1999.

Lutz, et al., "Fast Measuring of Solid Angles by Means of CCD Line Scan Cameras with Analytically Refined Optics", Engineering in Medicine and Biology Society 1994, Engineering Advances, New Opportunities for Biomedical Engineers, Proceedings of the 16th Int'l Conference of the IEEE, 3–6: 1994.

Maass, et al., "Open Mobility Management Platform with Directory–Based Architecture and Signalling Protocols", *Open Architecture and Network Programming, IEEE*, 1998.

Mandato, et al., "CAMP: A Context–Aware Mobile Portal", *2000 IEEE Service Portability and Virtual Customer Environments*, 52–61, 2000.

Nelson, G.J., "User Interaction with Machines on the Move: Location Aware Computing", Proceedings of the 4th Workshop on Enabling Technologies, *Infrastructure for Collaborative Enterprises*, 164–170, 1995.

Pfeifer, et al., "A Modular Location–Aware Service and Application Platform", *Proceedings, IEEE Int'l Symposium on Computers and Communications*, 137–148, 1999.

Puskorius, et al., "Camera Calibration Methodology Based on a Linear Perspective Transformation Error Model", *Proceedings of the 16th Annual Int'l Conf on Robotics & Automation*, 3: 1858–1860, 1988.

Ren, et al., "A Smart Network with Active Services for Wireless Context–Aware Multimedia Communications", *Wireless Communication and Systems*, 17.1–17.5, 1999.

Rhodes, et al., "Wearable Computing Meets Ubiquitous Computing: Reaping the Best of Both Worlds", Digest of Papers, 3rd Int'l Symposium, 141–149, 1999.

Schilit, et al., Disseminating Active Map Information to Mobile Hosts, *IEEE Network*, 22–32, 1994.

Schilit, et al., "Context–Aware Computing Applications", *Proceedings of the Workshop on Mobile Computing Systems and Applications, IEEE*, 85–90, 1994.

Starner, et al., "The Locust Swarm: An Environmentally–Powered, Networkless Location and Messaging System", Proceedings of the 1st Int'l Symposium on Wearable Computers, *IEEE*, 169–170, 1997.

Taplin, et al., "Displacement Sensor Using Channelled Spectrum Dispersed on A Linear CCD Array", Electronics Letters, 29(10): 896–897.

Tarumi, H., "Space Tag: An Overlaid Virtual System and Its Applications", *IEEE International Conference on Multimedia Computing System*, 1: 207–212, 1999.

Ward, et al., A New Location Technique for the Active Office, *IEEE*, Personal Communications, 42–47, 1997.

Wilkins, G.D., "Holographic Optical Elements and Charge Coupled Device Technology at Work in Laser Communications Acquisition and Tracking Systems", *Proceedings of the IEEE, NAECON*, 1170–1173, 1992.

\* cited by examiner

FIG. 6

NON-VISIBLE COMMUNICATION SYSTEMS

This application is a continuation of and claims priority to U.S. patent application Ser. No. 09/291,709, filed Apr. 14, 1999, now U.S. Pat. No. 6,400,482, issued Jun. 4, 2002, and U.S. Provisional Patent applications 60/081,866 dated Apr. 15, 1998, 60/108,287 dated Nov. 13, 1998 and 60/115,374 dated Jan. 11, 1999, the contents of which are hereby incorporated by reference in their entirety. This application hereby also incorporated by reference in their entirety the contents of the following patent, patent applications and other documents and all the references included or mentioned in this application or in each of these references: U.S. Pat. No 6,198,230, "Dual Use Electronic Transceivers for Wireless Data Networks" issued Mar. 6, 2001, to Leeb et. al.; U.S. patent applications Ser. Nos 09/291,706 "Dual Use Electronic Transceivers for Wireless Data Networks: filed Apr. 14, 1999, 09/292,126 "Analog and Digital Electronic Transceivers for Dual-Use Wireless Data Networks filed Apr. 14, 1999, now U.S. Pat. No 6,504,633, issued Jan. 7, 2003, and 09/770,806 "Dual Use Electronic Transceivers for Wireless Data Networks filed Jan. 26, 2001, now U.S. Pat. No. 6,426,599 issued Jul. 30. 2002; U.S. Provisional Patent applications Nos 60/081,866 "Fluorescent Lamp Digital Transceiver" filed Apr. 15, 1998, 60/108,207 "Visible Lighting Communication System" filed Nov. 13, 1998, 60/115, 374 "Visible Lighting Communication System II" filed Jan. 11, 1999, 60/191,725 "Communication Networks" filed Mar. 24, 2000, 60/308,486 "Hybrid Wireless Network" filed Jul. 25, 2001, 60/311,037 "Multi-Element Assistive Network" filed Aug. 9, 2001, 60/326,277 "Dual Use Lighting for Assistive Communications" filed Oct. 1, 2001, 60/338, 912 "Modulated Lighting" filed Nov. 26, 2001, 60/337,491 "Spread Spectrum Arc Lighting Communication" filed Nov. 26, 2001,60/341,191 "Vehicle Guidance" filed Dec. 7, 2001, 60/353,253 "Optical Communications" filed Feb. 1 2002 and 60/367393, "Incandescent Light Optical Communication" filed Mar. 25, 2002; PCT Applications Nos. WO00/ 30415 "Communication Systems" published May 25, 2000, WO99/53633 "Analog and Digital Electronic Transceivers for Dual-Use Wireless Data Networks" published Oct. 21, 1999 and WO99/53732 "Dual-Use Electronic Transceiver set for Wireless Data Networks" published Oct. 21, 1999; Leeb S. B. et. al "Assistive Communication Systems for Disabled Individuals using Visible Lighting," 15$^{th}$ *International Conference on Technology and the Disabled*, Mar. 24, 2000 and Jackson, Deron K. et al. "Fiat Lux, A Fluorescent Lamp Transceiver" *IEEE Transactions on Industrial Applications*, vol 34, No. 3, p 625–630, May/Jun 1998.

BACKGROUND OF THE INVENTION

A communication network is a means for conveying information from one place to another. The information can be in audio, digital data, video, text, graphics, data, sign language or other forms. The network can be a wide area network such as an intranet in an office, store or factory. Establishing and maintaining communication networks is one of the oldest known activities of mankind ranging from the shouting and drum signals of prehistory through written messages, signal flags, signal fires, smoke signals, signal mirrors, heliographs, signal lanterns, telegraphs, radios, telephones, televisions, microwave signals, linked computers and the internet. Improving communication networks will continue to be a major technical focus in the future.

The ideal communication network would be non-intrusive, inexpensive, extremely large information carrying capability (wide bandwidth), instantaneous and suitable for use with a broad variety of transmission and reception technologies.

There have been a few reports of the use of visible lighting as a carrier in electronic communication networks. The earliest reference to using lighting to send electronic information as well as to provide illumination appears to be Dachs (U.S. Pat. No. 3,900,404) disclosing an analog amplitude-modulation (AM) scheme to modulate the arc current in a fluorescent lamp, the "carrier" signal, with an audio information signal. King, Zawiski and Yokoun (U.S. Pat. No. 5,550,434) disclosed an updated electronic circuit that also provides for AM modulation of the arc current with an analog signal. Smith (U.S. Pat. No. 5,657,145) teaches a method for encoding low-bandwidth digital information into the lamp light using a pulsed AM technique. The encoding technique involves chopping 100 microsecond slices of current out of the arc waveform. Nakada (Japanese Patent application 60-32443, Feb. 19, 1985.)reports a FM modulation and a frequency shift keying (FSK) scheme to transmit digital data using visible lighting. Gray (U.S. Pat. No. 5,635,915 Jun. 3, 1997 and PCT WO90/13067, Oct. 11, 1991.) has reported a product pricing system for supermarket shelf labels where a signal is sent from visible lighting to individual product price labels on shelves to cause the listed prices to change when desired.

Other communication schemes have been proposed that do not use the lamp light as the carrier, but instead use the lamp fixture as an antenna for transmitting conventional radio wave or microwave signals. In Uehara and Kagoshima (U.S. Pat. No. 5,424,859), for example, the inventors disclose techniques for mounting a microwave antenna on the glass surface of fluorescent and incandescent lamps. Buffaloe, Jackson, Leeb, Schlecht, and Leeb, ("Fiat Lux: A Fluorescent Lamp Transceiver," *Applied Power Electronics Conference*, Atlanta, Ga., 1997) first outlined the possibility of using pulse-code modulation to transmit data with a fluorescent lamp. In the latter reference, a three-level code shifts the arc frequency to one of three possibilities every Tsw=2 milliseconds. The result is a steady light output, on average, with no perceptible flicker. A one or a zero bit does not correspond to a particular arc frequency, but rather, to a three level pattern in arc frequency. A logic zero bit is transmitted by varying the arc frequency first to 40 kHz, then to 38 kHz, and finally to 36 kHz. A logic one bit is transmitted by the arc frequency pattern beginning with 38 kHz, followed by 40 kHz, and ending with 36 kHz. A unique start bit, used to demarcate the beginning of a transmitted byte, is represented by a sequence in the arc frequency beginning with 36 kHz, followed by 38 kHz, and ending with 36 kHz.

In our previously filed patent applications Ser. No. 09/291,706 filed Apr. 14, 1999 and entitled "Dual-Use Electronic Transceiver Set for Wireless Data Networks" and application Ser. No. 09/292,126 filed Apr. 14, 1999 entitled "Analog and Digital Electronic Receivers for Dual-Use Wireless Data Networks", we have disclosed visible light communications networks for analog and digital data based on frequency modulation of light. The modulation techniques include direct FM, 2 level half weight bit coding and other orthogonal bit coding schemes.

The visible light case mentioned above is a specific case of our invention which, stated generally, involves simultaneous intentional dual use of transmitted electromagnetic radiation for two completely different useful purposes.

SUMMARY OF THE INVENTION

With the new technology disclosed in our previously filed applications, the recent advances in computer technology and other improvements in electronics, a number of applications and uses are now enabled. These applications are most preferentially executed using our new technology. However, in some cases, they may be executed using some of the other technologies known in the prior art.

Our communication network contains the following elements in series:

a) A source of the information which will be transmitted b) A transmitter, which includes lamp and a means for controlling the modulation of the lamp to cause the lamp to carry a signal c) A medium through which the light passes from the transmitter to the receiver d) A receiver for receiving and demodulating the light in order to obtain the information e) A user for the information. This user can be a device, like a computer or a compact disk player, or it can be a person.

Our invention embodies a number of uses and purposes for the light based communication network. One purpose is to process the signal from the light is by the receiver to control the selection of information from a computer memory, CD or other storage device for large scale storage of data, greatly increasing the effective bandwidth of the information which can be transmitted. Another purpose is to provide data to the user from the receiver from both a large scale data storage device, like a computer memory, compact disk or other such device, and from the information transmitted by the light, with segments of data from the sources interspersed in presentation to the user. Another purpose is to provide data from a device source, like a computer chip, a tape cassette a compact disk or other such device, to the transmitter. Another purpose is to repeat continually the data from the device source, providing a continuous signal of finite period to the user. Another purpose is to use two or more transmitting lights, each transmitting its own signal at the same frequency to provide spatial resolution of signal so that the receiver will receive and provide to the user information from only one of the lights at any time and the receiver may shift its reception from one light to another. Another purpose is to transmit two or more different signals simultaneously at different frequencies from one light in such a manner that two or more receivers can each pick up the different signals. Another purpose is to transmit two or more different signals containing the same information in two or more different languages or codes so that by selecting the proper frequency, the user can select information in the language or code they deem most suitable. Another purpose is to encrypt the information prior to transmission and decrypted it subsequent to receipt. Another purpose is to use the lighting of an individual exhibit to provide to the user a description of some aspect of the exhibit. Another purpose is to transmit information over the network is used to provide assistance to individuals who are visually impaired. Another purpose is to transmit information transmitted over the network to provide assistance to individuals who are hearing impaired. Another purpose is to transmit over the network to provide assistance to individuals who are mentally impaired. Another purpose is to transmit the information transmitted over the network for processing by the user and subsequent sending out of a responding signal by the user using some means. Another purpose is to use the network to provide information to a receiver and user which are moving. Another purpose is to use the network to provide information inside an aircraft, boat, submarine, bus, auto, train or other vehicle. Another purpose is to use the network to provide guidance information to a receiver and user which are moving. Another purpose is to use the network to provide safety or warning information. Another purpose is to use create a network where the same information is being provided by a plurality of different lights. Another purpose is to use the network to provide paging information to the user. Another purpose is to provide information in classrooms and other meeting rooms. Another purpose is to create a repeater network where the modulated signal initiated by one light will be received by an adjoining light, that light started modulating, etc. until all lighting in a network is being modulated and carrying the signal. Another purpose is to create a network in which the electromagnetic radiation which is modulated is infrared radiation. Another purpose is to create a network in which the electromagnetic radiation which is modulated is ultraviolet radiation. Another purpose is to create a network in which the electromagnetic radiation which is modulated is radio frequency radiation. Another purpose is to create a network in which the electromagnetic radiation which is modulated is microwave radiation. Another purpose is to create a network in which the electromagnetic radiation which is modulated is X-ray radiation. Another purpose is to create a network to transmit compressed data.

DETAILED DESCRIPTION OF CERTAIN PREFERRED EMBODIMENTS

A Computer as a User

One important application for our communication network involves inputting data into a computer. In one usage of this approach, light can be used as a positional locator or a data source. One such device which would use light provided digital data we will refer to as a Personal Locator and Minder or PLAM. In this system, each modulated light will deliver a relatively simple unique signal. This signal could either be a random signal which is uniquely assigned to that light, or else could be based on some kind of geographical matrix. The Personal Locator and Minder will receive the signal from the nearest modulated light, identify the location of that light from information in its memory, compare the location of that light with the location the PLAM is scheduled to be at that particular moment, and then carry out appropriate actions in accordance with its preprogramming. This aspect has application to patients in a hospital or assisted care facility context.

Since each patient has their own PLAM programmed with their own schedule, the system can accommodate as many different patients simultaneously as is desired. Each light will be continuously communicating location. The individual patient's PLAM will be reading this location information and then giving the individualized guidance to the patient.

The second programming feature which can be included in the PLAM will be the ability to record the daily activities and mobility of a patient. In addition to providing and cueing a personal schedule for a patient, the PLAM can also record how many warnings or inconsistencies in schedule versus actual location occurred during the course of an arbitrary time interval. This information could be stored in the PLAM and downloaded when convenient giving a unique and highly detailed record of a patient's mobility and awareness at every location and time during a day.

Another important application for the computer as user will involve the use of an addressable electronic memory device. This device can be a RAM type device, ROM computer memory or storage device like a CD. The addresses can be partially or totally selected based on information provided over modulated lights. The information from the memory can then be used for any of the purposes well known in the art.

Still another application for the computer as user involves the decryption of an encrypted message. The message is encrypted using a method known in the prior art for which there is a decryption key. The key is not provided to the user and is not retained in the computer. The decryption key is supplied continually over the modulated lights. Only when the lights are providing the key can the user decode the information. The security code can be varied in a timed fashion or some other method known in the art. This providing of the decryption code by the lights will provide an additional level of security since only when the user is in the physical presence of the lights will the encrypted message be able to be decoded.

The most general statement of our invention is that it involves simultaneous intentional dual use of transmitted electromagnetic radiation for two or more functionally different useful purposes. An example of such a dual use of electromagnetic radiation other than visible radiation would involve the frequency modulation of a radar signal used to track civilian aircraft so that it also would carry audio information to the aircrew. Another such example would involve the modulation of an infrared illuminator used to allow night vision goggles to be used so that the operator of the illuminator could communicate with the wearer of the night vision goggles or with another user in the field of vision of the infrared illuminator. One preferred embodiment of this invention in electromagnetic wavelength ranges outside the visible is in the infrared wavelength range, another preferred embodiment is in the ultraviolet wavelength range, another preferred embodiment is in the X-ray wavelength range, another is in the radio wavelength range, another is in the microwave wavelength range.

When the wavelength range of the electromagnetic radiation used for one or more simultaneous functionally different useful purposes is outside the visible wavelength range, we will refer to that radiation as "non-visible radiation." It is understood that under some circumstances, a source which is intended to generate electromagnetic radiation outside the visible wavelength range will also generate some visible radiation. If one or more of the simultaneous useful purposes makes principal use of radiation outside the visible wavelength range, it will be considered "non-visible radiation" notwithstanding the generation of the visible radiation. An example would be a suntanning booth in which the UV light source would be modulated in order to allow communication with the user. Even though the UV light source would simultaneously generate some visible electromagnetic radiation, the useful purpose of tanning the skin would make principal functional use of ultraviolet radiation, so this radiation would qualify as "non-visible radiation." This designation as "non-visible radiation" would pertain whether the modulated UV light is detected by the receiver and used for communication, or the simultaneously generated visible electromagnetic radiation is detected by the receiver and used for communication. Since one useful purpose, namely tanning the skin, makes principal use of electromagnetic radiation outside the visible wavelength range, the radiation qualifies as "non-visible radiation."

In one preferred embodiment of this invention, one useful functional purpose of the embodiment is communication and the other useful functional purpose is some purpose other than communication. In another preferred embodiment, both useful functional purposes of the embodiment are some purpose other than communication.

In one preferred embodiment of the invention, one of the useful functional purposes makes primary use of electromagnetic radiation outside of the visible wavelength range. In another preferred embodiment of the invention, two or more of the useful functional purposes make primary use of electromagnetic radiation outside of the visible wavelength range.

An essential part of this invention is that the electromagnetic radiation must be free from application unacceptable flicker. Generally, this application unacceptable flicker occurs when variations due to the second utility of the radiation interfere with the first utility or vice versa. An example of application unacceptable flicker for visible radiation would be visually perceptible flicker such that the light is considered unacceptable for illumination. For other examples, such as a radar set, application unacceptable flicker could mean that the flicker would interfere with radar detection.

In the examples below, the exact circuitry and systems can be designed and built by an individual of ordinary skill in the art of electrical engineering using, where appropriate, the unique communication network of our previously filed patent applications and patents identified above including but not necessarily limited to S. B. Leeb et. al., U.S. Pat. No. 6,198,230 (Leeb 230) and G. B. Hovorka et. al., U.S. Pat. 6,504,633 (Hovorka 4633).

EXAMPLE 1

Personal Locator and Minder Network

Figure 1:
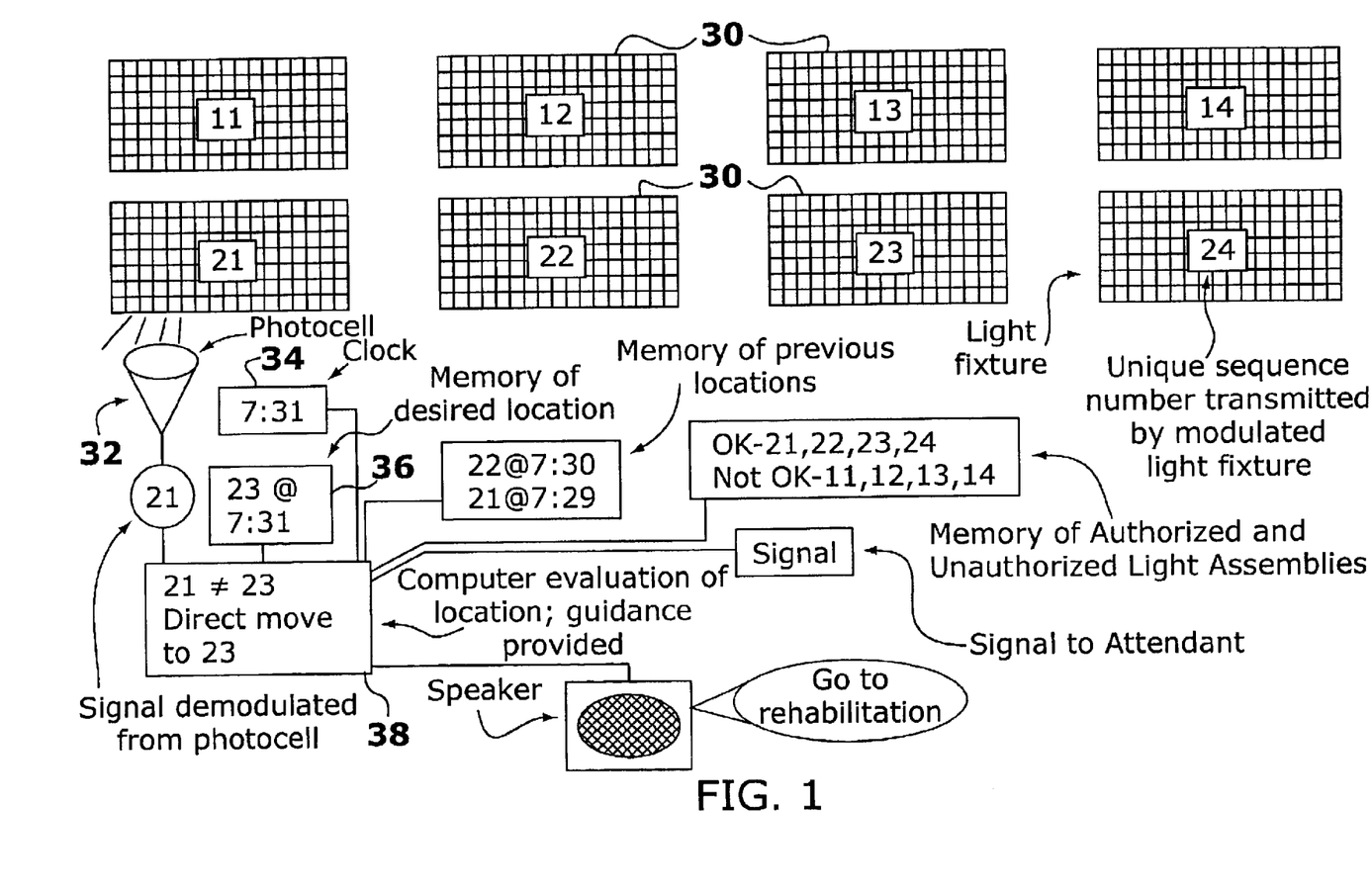
FIG. 1 is a schematic illustration of the invention.

As is shown in FIG. 1, the network is created with a plurality of modulated lights 30, each transmitting its own unique signal. In a preferred embodiment, each modulated light 30 is self contained, except optionally for a power supply, which can be either line power or battery power. The modulated lights are not controlled from a central location.

The PLAM in this example contains a photocell 32 capable of receiving light and circuitry capable of demodulating the signal from the nearest light and identifying the unique signal, a clock 34, a computer memory 36 capable of storing the desired location of the PLAM at any specified time, and a computer 38 capable of evaluating signal received from the photocell 32, comparing that signal with the desired location of the PLAM and presenting information to the user based on the comparison. This information could be reassurance or silence if the signal received is the desired preprogrammed location signal, while it could be guidance or remonstrance if the signal received is not the desired preprogrammed location signal.

Each of a plurality of users can have their own PLAM programmed with their own schedule. Each light will be continuously communicating location. The individual user's PLAM will be reading this location information and then giving the individualized guidance to the user.

PLAM and its enhancements can be valuable to a number of users including brain disabled individuals, such as individuals suffering from traumatic brain injury, Alzheimer's disease or other dementia; children in a child care environment; and individuals in a secure environment whose movements must be monitored and recorded.

EXAMPLE 2

Enhanced Personal Locator and Minder

PLAM is programmed with the planned schedule for the user. When the time for one of the day's scheduled activities is noted by PLAM, the device takes note of the nearest modulated light and compares that with the location where the patient should be. If the light is in the place where the user is scheduled to be, the device simply notes this. However, if the user is in a place other than where he or she is scheduled to be, the device will remind the user of their scheduled location. A more sophisticated version of PLAM will also have in its memory the proper route for the patient to take to proceed to their desired location. As the user would proceed along the path to their desired location, PLAM will take note of the lights which the device is passing and correct the patient if they should take a wrong turn or stop.

EXAMPLE 3

Personal Locator and Minder with Alarm

The PLAM also contains a radio transmitter, microwave transmitter or other transmitter device. If the user of the PLAM is determined by the computer to be in an unauthorized area, this PLAM sends a signal to an attendant. This attendant could be a nurse in a hospital environment, a teacher or day care attendant in a day care environment or a security guard in a secure environment.

EXAMPLE 4

Personalized Voice Messages

In the previous examples, the computer memory of the PLAM is programmed with a voice of personal significance to the user. We define a voice of personal significance to the user to be a voice of a person who has some significant emotional and/or historical tie to the user. Most preferred as voices of personal significance would be the voice of the person themself, or the voices of the person's parents, siblings, children, spouse, business partners. or close friends. Other examples of voices of personal significance, not intending to be limiting, would be the person's former spouse(s), school classmates, friends and acquaintances, coworkers, current or former neighbors, and physicians, nurses or other caregivers.

EXAMPLE 5

Enhanced PLAM with Recording Capability

To the PLAM of Example 2 will be the ability to record the daily activities and mobility of a user. In addition to providing and cueing a personal schedule for a user, the PLAM can also record how many warnings or inconsistencies in schedule versus actual location occurred during the course of an arbitrary time interval. This information could be stored in the PLAM and downloaded when convenient by a monitor, such as a skilled care provider, giving a unique and highly detailed record of a user's mobility and awareness at every location and time during a day.

EXAMPLE 6

Programming the PLAM using Modulated Lighting

To the PLAM of Example 2 will be add the ability to have the programming in the computer changed by information received over the lighting. The programming information is transmitted over light using one of the techniques previously taught. The information is prefaced with a code to indicate to the computer that it is programming information. The programming information so received is then stored in the computer memory and used by the computer in making decisions and in giving guidance to the user.

EXAMPLE 7

Message Selected from Computer Memory

A memory device such as a computer memory, CD, or tape is loaded with a number of messages which can prove useful. Each message is stored in a coded, identifiable location in the memory device. A coded signal is sent over the network indicating which coded location and which message should be played. The coded signal is received, processed by a computer and used to identify and call up the message from the memory. The message from the memory is presented to the user. This message could be an audio message, textual message, graphical message or other message.

EXAMPLE 8

Mixed Message from Computer Memory and Light Carried Message

The devices of Example 7 have an enhanced capability to receive and process more extensive information from the lights. The system has the capability to present information in a mixed fashion. As an example, the system could be cued to present and then present aurally "This is the office of" from the computer memory and then "Mr. Smith" from the light transmitted audio message.

EXAMPLE 9

Encryption Code

A message is encrypted using one of a number of encryption techniques known in the art which require an decryption code. The user is not provided with the decryption code.

The computer or other device provided to the user has a receptor circuit which can receive and process encoded signals from the lighting in the area. The ambient lighting is modulated to contain the decryption code. The computer is able to process and decrypt the encrypted message only so long as the receptor circuit is viewing and processing the decryption code.

EXAMPLE 10

Multiple Channels

A network is constructed with two or more lights in proximity transmitting information on two or more different frequencies or else with one or more lights each transmitting information on two or more different frequencies creating channels of information. A receiver is provided which is able to receive and process information from these channels. Different information is transmitted on the different channels.

EXAMPLE 11

Multiple Channels to Transmit Different Languages

In the network of Example 10, information is transmitted using the different channels to transmit different languages. As an example, one channel could transmit information in English and another channel to transmit the same information in Spanish.

EXAMPLE 12

Lighting to Provide Descriptions of Exhibits

In an facility where there are two or more areas with different items being exhibited, each area is provided with its own separate lighting. This lighting is modulated to provide a description of the exhibit which is being lighted. The user is provided with a receptor which will allow the user to receive a description of the exhibit. As the user moves from one exhibit to another, the lighting provides the appropriate description of the exhibit which they are viewing.

EXAMPLE 13

Assistance to the Visually Impaired

The lights in a facility are modulated to provide guidance information to individuals who are visually impaired. This information could be of the sort of "Office X is on the right" or "The stairs are on the left." A visually impaired individual would have a receptor to process this information and receive the guidance.

EXAMPLE 14

Assistance to the Hearing Impaired—Aural

The lights in a facility are modulated to provide information to individuals who are hard of hearing and require assistance. The information could be provided through a speaker, earphones or through a neck loop into a magnetic induction type hearing aid.

EXAMPLE 15

Assistance to the Hearing Impaired—Textual

The lights in a facility are modulated to provide information to individuals who are deaf or hard of hearing and require assistance. The information could be textual, graphical or pictorial information.

EXAMPLE 16

User which is Moving

The lights in an area are modulated to contain information. A user which is moving is provided with a receiver. Information is transmitted to the user which is moving.

EXAMPLE 17

Lighting Inside a Vehicle

The lighting inside or on a vehicle is modulated to contain information. A user inside or on the vehicle is provided with a receiver. Information is transmitted to the user which is inside or on the vehicle. The vehicle can be an aircraft, boat, submarine, bus, auto, tank, other military vehicle, wheelchair, spacecraft or other vehicle. The vehicle can be moving or stationary.

EXAMPLE 18

Guidance and Directional Information to a Vehicle

Figure 2:
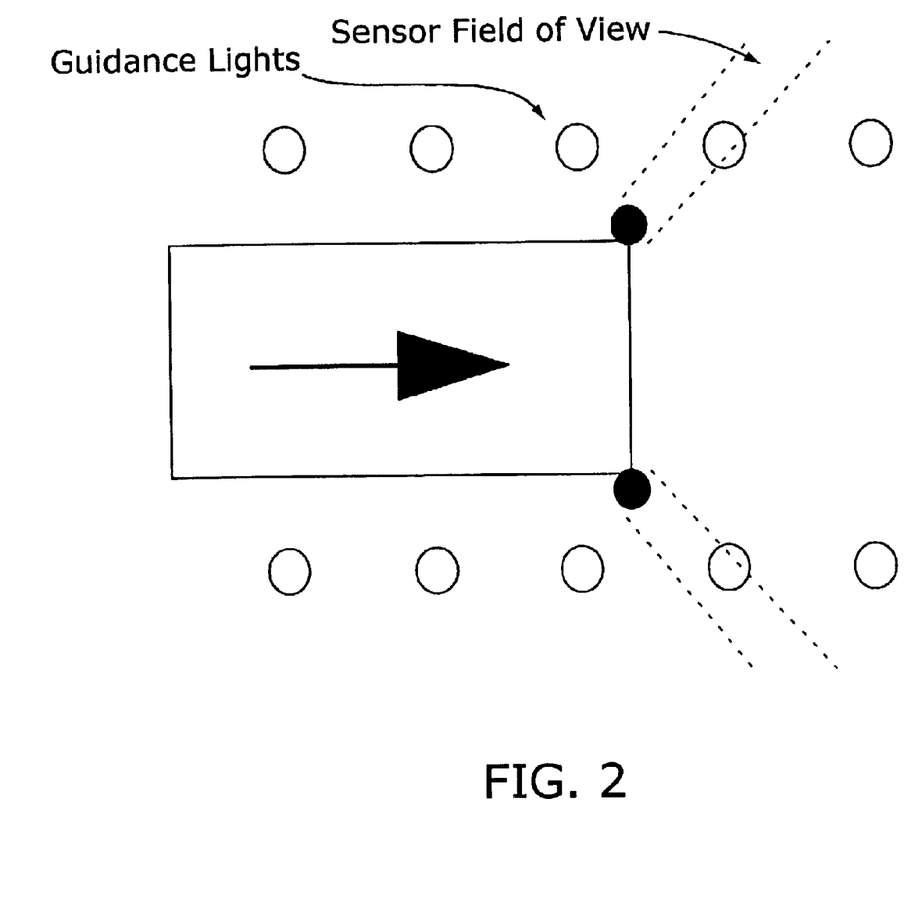
FIG. 2 is a schematic illustration of a guidance embodiment of the invention.
Figure 3:
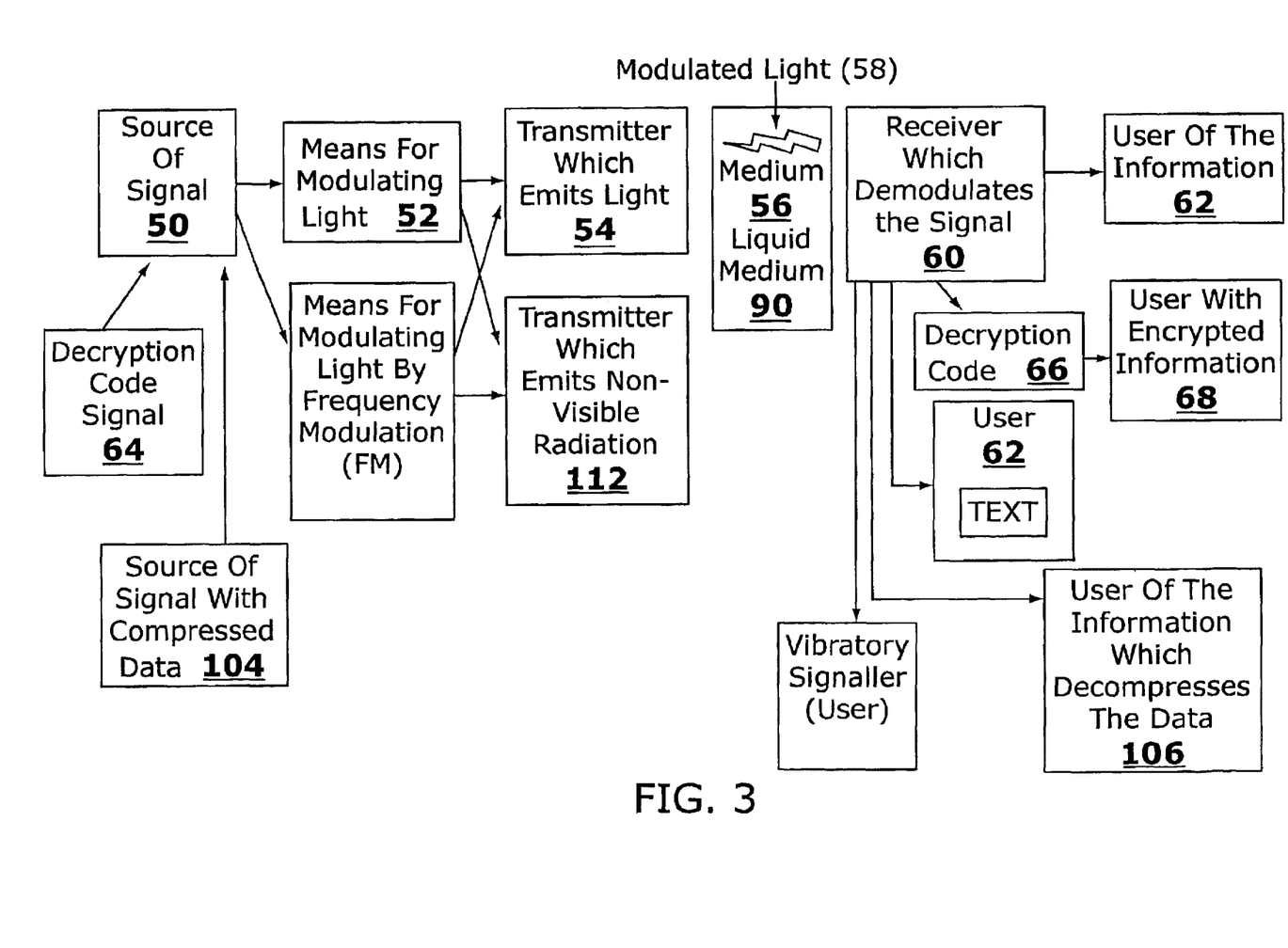
FIG. 3 is a schematic representing the relationship among various elements that may comprise the communication network of the present invention.
Figure 4:
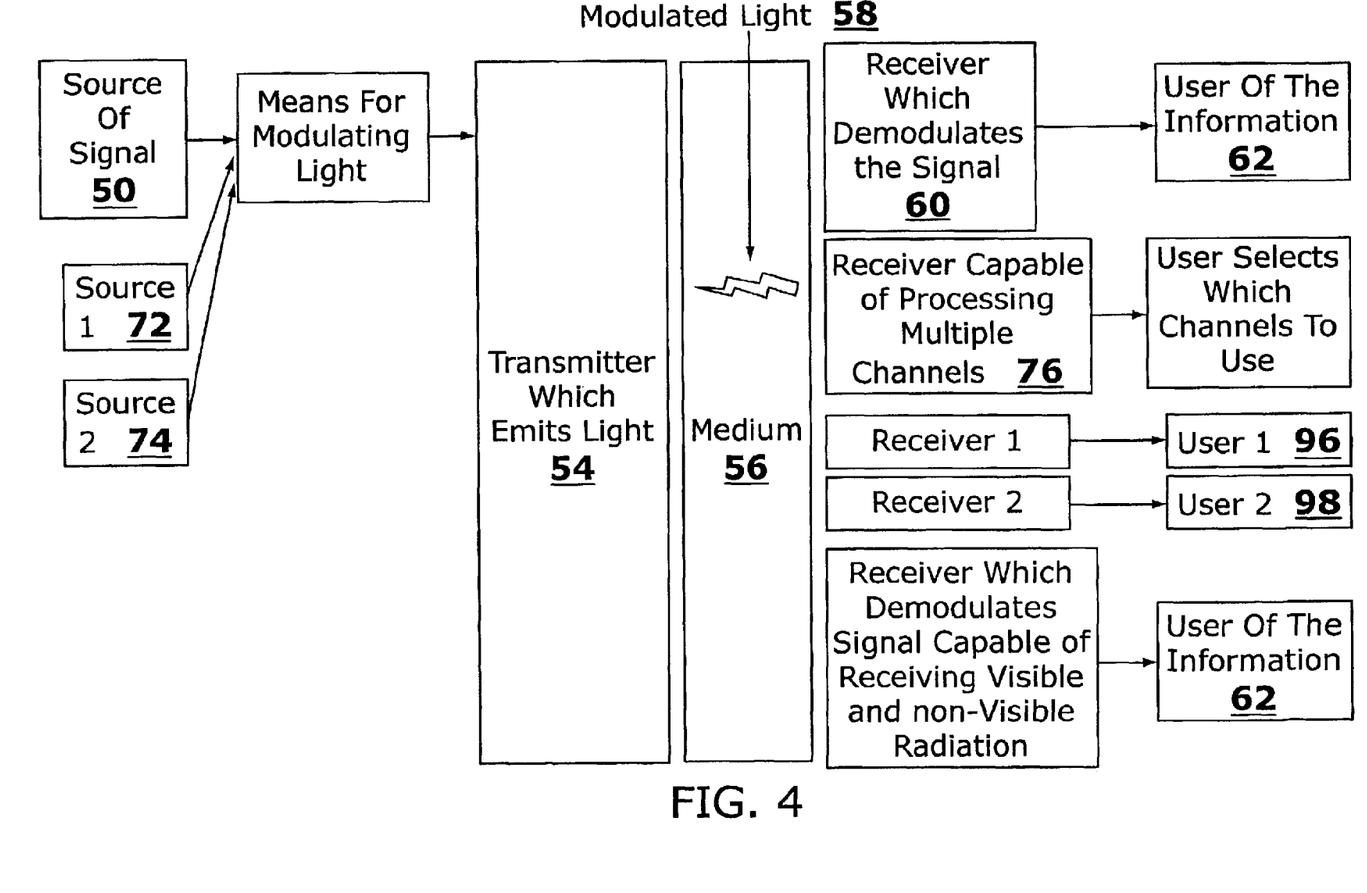
FIG. 4 is a schematic illustrating another embodiment of the communication network of the present invention.
Figure 5:
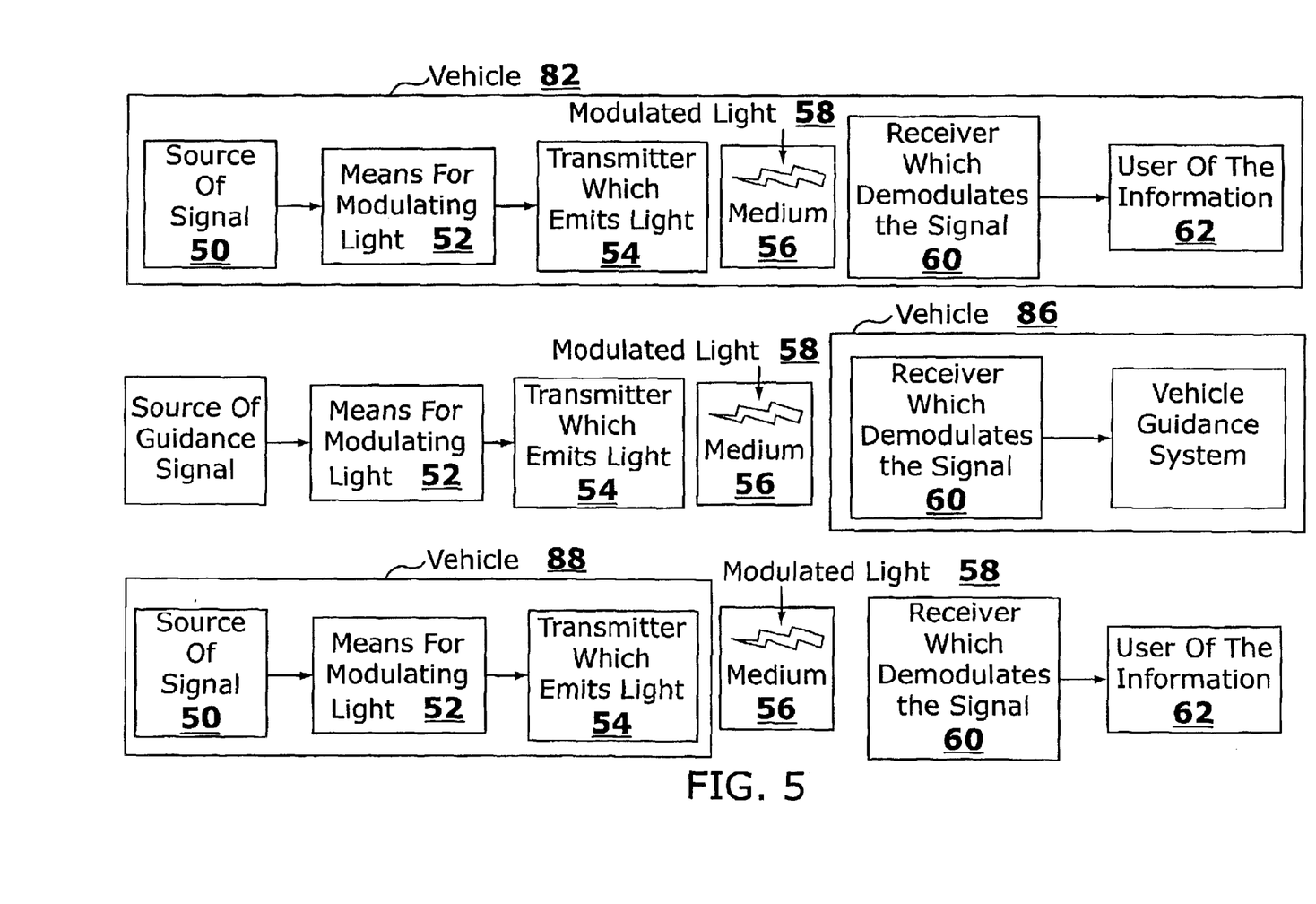
FIG. 5 is a schematic illustrating how the communication network of the present invention may be used in connection with a vehicle.
Figure 6:
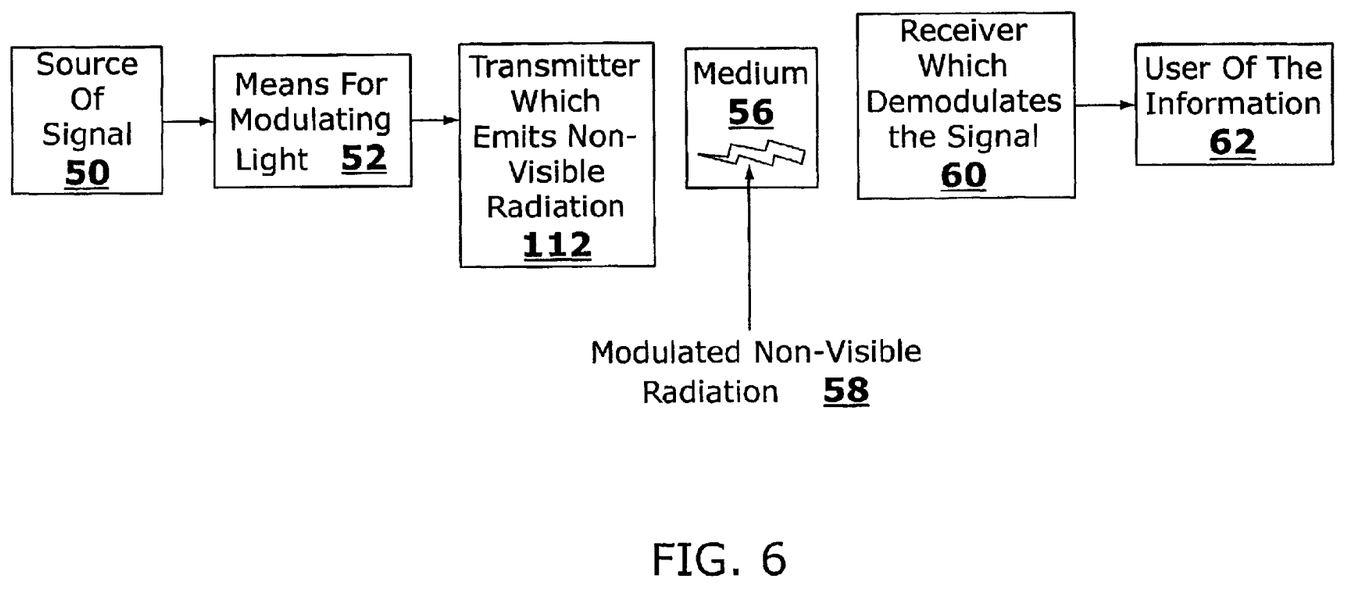
FIG. 6 is a schematic representing the relationship among various elements that may comprise the communications network of the present invention.

Lighting outside a vehicle is modulated to provide information. Each light or sequence of lights is modulated to contain directional information or guidance information. The vehicle has sensors which in a sequential form will view the lights. By processing the information from the lights in sequence, and determining which lights are and are not in the field of view of the sensors, the vehicle can maintain its direction of travel. This is shown in the FIG. 2 below.

EXAMPLE 19

Modulated Running Lights

Circuitry is provided to modulate the running lights on a vehicle. These lights will carry information generated by a source inside the vehicle. A receiver outside the vehicle can receive and process this modulated light and process the information to a user outside the vehicle. Another embodiment of this example would be the modulation of the headlights on a vehicle.

EXAMPLE 19

Repeater Network

One light in a facility is modulated with a signal to carry information. An adjoining light has a receptor which is positioned to view the signal from the first light. This signal is processed by the circuitry in the second light and the signal from the second light is modulated to transmit the same signal as is contained in the modulated signal from the first light. A third light has a receptor which is positioned to view the signal from the second light. This light also has a repeater circuit similar to the second light. A network of lights throughout the facility is, in this manner, modulated to carry the same signal as the first light.

EXAMPLE 20

Transmission Through Fluid

A light is modulated to carry a signal. The electromagnetic radiation from this light is allowed to fall on a receiver/receptor and the signal is processed. Water is placed in the path between the light and the receiver. No change is observed in the signal which is processed. The light is carried by a SCUBA diver who is underwater and is using the light for underwater illumination. The receiver is carried by another SCUBA diver who makes use of the information transmitted by the modulated light.

EXAMPLE 21

Transmission Through Vacuum or a Reduced Pressure Medium

A light is modulated to carry a signal. The electromagnetic radiation from this light is allowed to fall on a receiver/receptor and the signal is processed. Air or any other gas is partially or completely removed from the medium between the light and the receiver to a pressure below 0.5 atmospheres. No change is observed in the signal which is processed. The light is carried by an astronaut who is in space and is using the light for illumination. The receiver is carried by another astronaut or by a spacecraft which makes use of the information transmitted by the modulated light.

EXAMPLE 22

Signal Source from Computer Memory Provides Repetitive Signal

A computer memory is programmed to repeat, continuously, an information signal. This information signal is used to control the modulation of a light signal. A receiver receives and processes this information.

EXAMPLE 23

Signal Source Provides Non Repetitive Signal

A non repetitive signal is provided from a microphone, tape, CD, record or other information storage device. This non-repetitive signal is used to control the modulation of a light signal. A receiver receives and processes this information.

EXAMPLE 24

Lecture Hall

A network is created in a facility where two or more users are present. The users each have individual receivers and make personal use of the information transmitted by the lights.

EXAMPLE 25

Non-visible Radiation—Ultraviolet

A mercury vapor lamp capable of producing ultraviolet radiation which can tan the skin is modulated to carry information. A receiver of the type taught in the copending applications and patents identified above including but not necessarily limited to Leeb 230 and Hovorka 4633.

EXAMPLE 26

Non-visible Radiation—Infrared

An infrared illuminator is used to provide illumination for a viewing display which can receive infrared radiation and present it to a user as a visible display. This infrared illuminator is modulated to carry an analog audio signal. A receptor of the type taught in the copending applications and patents identified above including but not necessarily limited to Leeb 230 and Hovorka 4633.

EXAMPLE 27

Non-visible Radiation—MRI

A user is placed in an MRI device. The device is operated in the normal fashion, using electromagnetic radiation of the proper wavelength to create magnetic resonance. This electromagnetic radiation is also modulated to carry information to allow communication with the user.

EXAMPLE 28

Compressed Data

Data from the signal source is compressed using a compression technique known in the art. Compressed data is transmitted over the network. The data is decompressed after it is received and processed by the receiver. The decompressed data is presented to the user.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

We claim:

1. A network comprising:

a signal source apparatus to provide information;

an electromagnetic radiation generator capable of being modulated for providing electromagnetic radiation not visible to the human eye;

a connection means for connecting the signal source apparatus to the electromagnetic radiation generator;

electronic circuitry for modulating the electromagnetic radiation;

a medium through which the electromagnetic radiation passes and is transmitted;

a receiver apparatus for receiving and demodulating the modulated electromagnetic radiation;

a first user means for processing and making use of the information to achieve a first useful functional purpose; and a second user means for achieving a second useful functional purpose from said non-visible radiation, said useful functional purpose being different from the purpose of said first user means, wherein the modulation and use of the network for the first useful functional purpose does not significantly interfere with achieving the second useful functional purpose and the modulation and use of the network for the second useful functional purpose does not significantly interfere with achieving the first useful functional purpose, wherein the electromagnetic radiation is used simultaneously to achieve the first useful functional purpose and the second useful functional purpose, and wherein the electromagnetic radiation is selected from the group consisting of infrared radiation and ultraviolet radiation.

2. The network of claim 1, wherein the useful functional purpose of either the first user means or the second user means comprises communication.

3. The network of claim 1, wherein the electromagnetic radiation is infrared radiation.

4. The network of claim 1, wherein the electromagnetic radiation is ultraviolet radiation.

* * * * *

UNITED STATES PATENT AND TRADEMARK OFFICE
CERTIFICATE OF CORRECTION

| | | |
|---|---|---|
| PATENT NO. | : 6,954,591 B2 | |
| APPLICATION NO. | : 10/161458 | |
| DATED | : October 11, 2005 | |
| INVENTOR(S) | : Elmer C. Lupton et al. | |

It is certified that error appears in the above-identified patent and that said Letters Patent is hereby corrected as shown below:

In the Specification, Page 1, col. 1, line 3; after the title insert the following text:

--This invention was made with government support under contract DAAE07-99-C-L068 awarded by the U.S. Army and other U.S. Government grants and contracts. The government has certain rights in the invention.--

Signed and Sealed this
Fourth Day of January, 2011

David J. Kappos
*Director of the United States Patent and Trademark Office*